June 18, 1968     J. M. GREENWELL     3,388,493
CLAMPING DEVICE COMBINED WITH A SHOPPING BASKET
Filed Oct. 5, 1966     2 Sheets-Sheet 1

INVENTOR.
JAMES M. GREENWELL
BY
Fisher, Christen, Sabol, Caldwell
ATTORNEYS

June 18, 1968 J. M. GREENWELL 3,388,493
CLAMPING DEVICE COMBINED WITH A SHOPPING BASKET
Filed Oct. 5, 1966 2 Sheets-Sheet 2
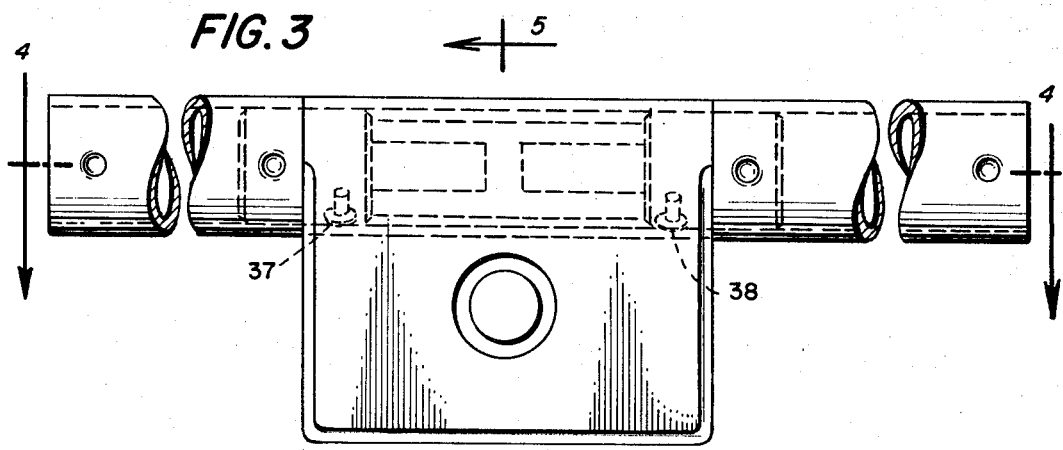
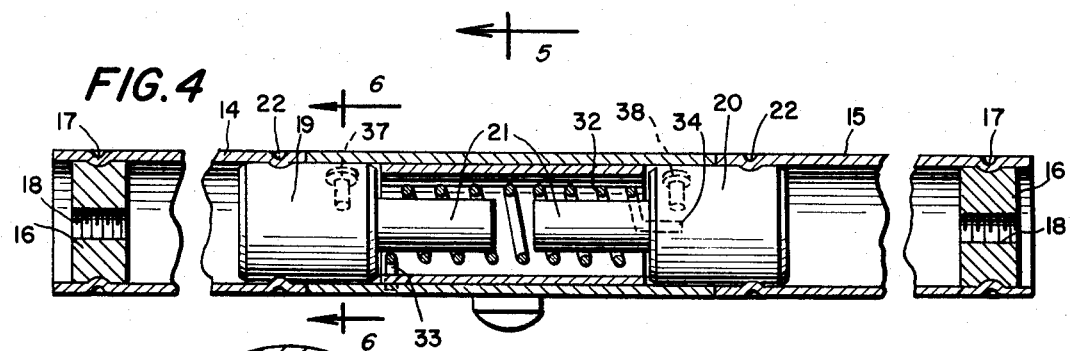
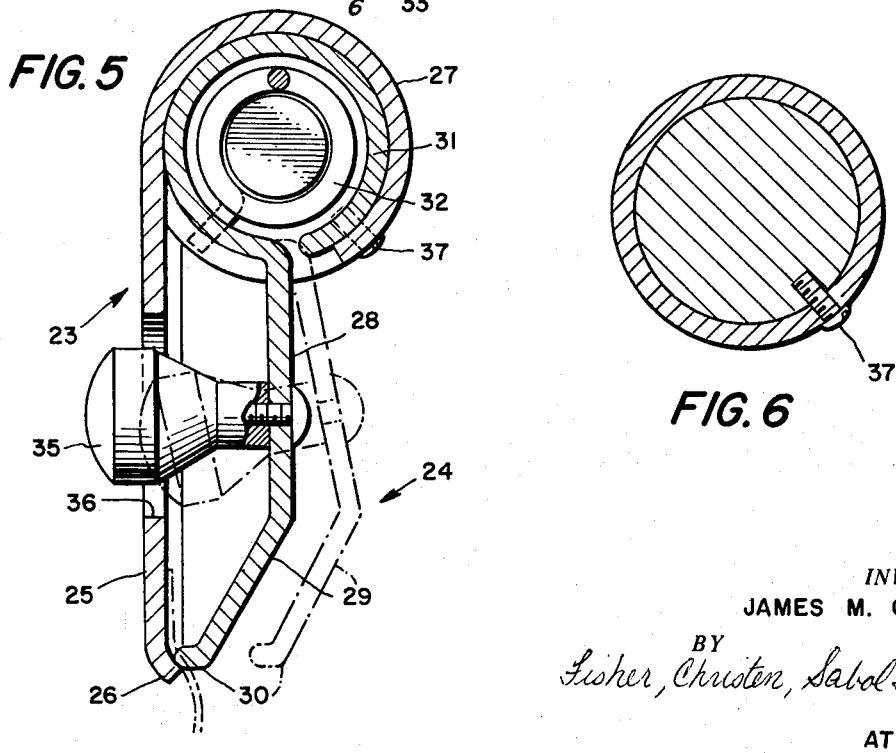
INVENTOR.
JAMES M. GREENWELL
BY
Fisher, Christen, Sabol, Caldwell
ATTORNEYS United States Patent Office 3,388,493
Patented June 18, 1968

3,388,493
CLAMPING DEVICE COMBINED WITH A
SHOPPING BASKET
James M. Greenwell, 3063 Wailani Road,
Honolulu, Hawaii 96813
Filed Oct. 5, 1966, Ser. No. 584,388
9 Claims. (Cl. 40—308)

This invention relates to merchandising devices, and more particularly, to a device for temporarily attaching a shopping list to a shopping cart for ready reference while using the cart.

While the invention has other applications, it is particularly adapted for use by housewives who customarily obtain household foods and supplies at stores of the type which have become commonly known as supermarkets, which stores usually provide as a convenience for the shoppers mobile carts, or baskets, into which the desired goods are deposited as the customer moves through the store selecting individual items from the shelves. Customarily, those who shop at these stores will provide themselves in advance with a list of items desired to be purchased and it is an object of this invention to provide a support means, or clamp, attached to each of the mobile shopping carts for holding such a list while the shopper is at the store, thereby freeing him from the necessity of holding the list as well as making it continuously available for ready reference.

It is a further object of the invention to provide a temporary clamp for holding a piece of sheet material which forms a component part of a shopping basket or cart.

It is a further object of the invention to provide a clip or paper holder of novel construction which may be easily incorporated into a tubular support, such as the handle of a shopping cart or basket.

Other objects and advantages will be apparent to those skilled in the art after reading the following specification in connection with the attached drawings, in which:

FIGURE 3 is a front elevation of the invention shown in FIGURE 2;

FIGURE 4 is a cross-section taken on the lines 4—4 of FIGURE 3;

FIGURE 5 is a transverse cross-section taken on the line 5—5 of FIGURE 3; and

FIGURE 6 is a transverse cross-section taken on the line 6—6 of FIGURE 4.

Figure 1:
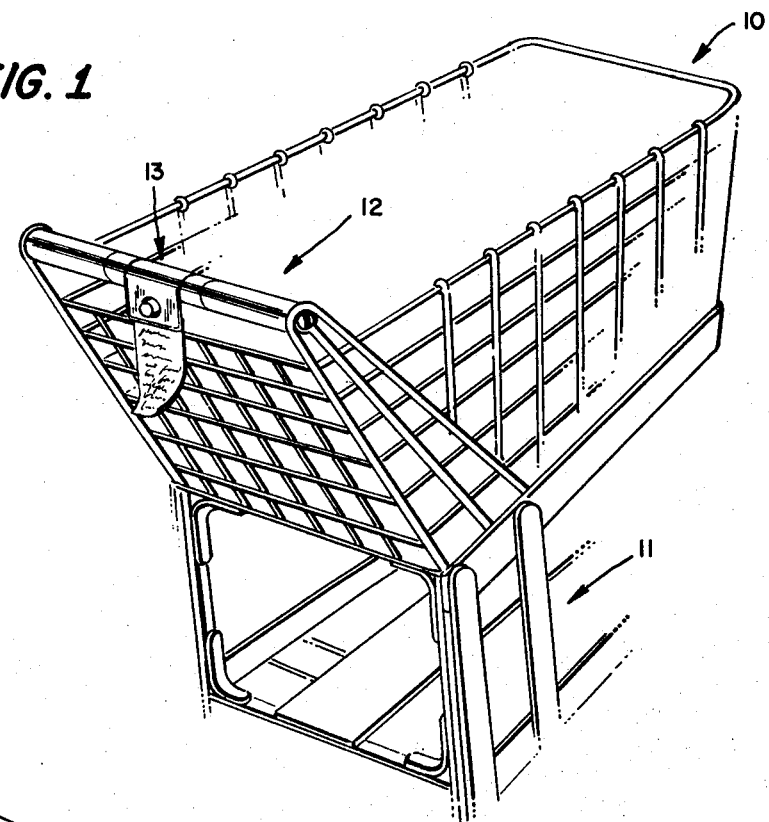
FIGURE 1 is an isometric view of a shopping cart having incorporated therein a preferred form of sheet holder made in accordance with the teachings of this invention.
Figure 2:
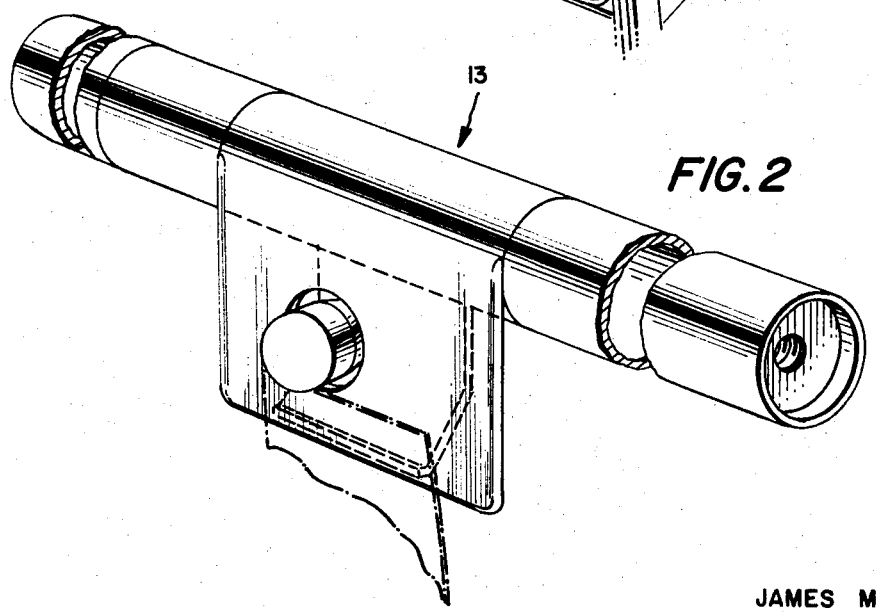
FIGURE 2 is a fragmentary isometric view of the invention but on an enlarged scale.

In FIGURE 1, there is shown a portion of a shopping cart of conventional construction having a basket portion 10 usually constructed of metal wire carried by a supporting frame indicated generally by numeral 11 which includes a set of wheels (not shown) enabling the basket to be pushed around the floor of a store, or warehouse, by the user. Shopping carts of this type are usually provided with a horizontal tubular handle, indicated generally by numeral 12, by means of which the basket may be maneuvered about the premises. In general the previously described components with the exception of the handle 12 are well known and form no part of this invention.

In the drawings there is also shown a clipboard, or sheet supporting device, indicated generally by numeral 13, which may be incorporated into the handle portion 12. The handle may include a pair of tubular portions 14 and 15 forming the respective end portions of the handle and into which, at their respective outer ends, there may be inserted a plug 16, each of which is securely positioned by any well-known means such as by dimpling the exterior of the tubes as indicated at 17. Each of the plugs may also be provided with a tapped central opening 18 for attachment to the frame of the basket 10.

The respective inner ends of the tubular sections 14 and 15 are also provided with cylindrical inserts, or plugs, 19 and 20 respectively, and each of these plugs is provided with a concentrically positioned pin 21 of considerably reduced diameter than the interior of the handle portion itself. These pins are in alignment with each other and project inwardly toward each other with their free ends spaced apart as shown in FIGURE 4. The plugs 19 and 20 project outwardly from their respective tubes to expose a portion of their peripheral surfaces and are firmly secured to the tubular portion 14 and 15, as by means of dimpling 22, or by any other suitable means.

The support means for a shopping list or other sheet material comprises a fixed jaw means, indicated generally by numeral 23, and a movable jaw means, indicated generally by numeral 24. The fixed jaw means may be formed from a sheet of strip metal to provide a generally rectangular flat front portion 25, the lower marginal edge of which 26 forms a gripping portion and, if desired, may be curved slightly backwardly. At the other end of the strip it is curved in a circular arc to form a supporting portion 27 having a radius such that the exposed portions of plugs 19 and 20 may be inserted therein in close fitting engagement, thus providing an exterior surface which conforms with the remainder of the handle portion.

A movable jaw member 24 may also be fabricated from a generally rectangular strip of sheet metal to provide a depending portion and a pivotal supporting portion. While the depending portion could be flat or slightly curved, in the form shown, it is fabricated with an upper flat portion 28 joined with a lower flat portion 29 which is angled slightly forwardly towards the fixed jaw means and terminates at its lower margin in a gripping portion 30, which may be bent forwardly if desired to cooperate with the fixed gripping portion 26. The top portion of the strip is formed in a generally circular arc 31 to fit loosely within the curved portion 27 of the fixed jaw so that it can serve as a pivot for the movable jaw to afford limited relative rotational movement with respect thereto. A biasing means, such as the coil torsion spring 32, is also contained within the circular portion of the movable jaw means and concentrically surrounds the two pins 21, one end of this spring 33 being turned radially outwardly to engage with a suitable opening at one end of the circular portion of the movable jaw means, while the other end of the spring 34 is turned axially outwardly to be received within a suitable opening provided in one end of the plug 20. This spring, as will be explained later, serves to urge the movable jaw in a clockwise direction, as seen in FIGURE 5, so as to maintain the gripping portions 26 and 30 in engagement with each other. The movable jaw may also be provided with an actuating knob 35 which projects in front of the fixed jaw a short distance through an opening 36 provided therein.

When the device is assembled, the exposed portion of plug 19 is inserted in the left-hand end of the top circular portion 27 of the fixed jaw and secured in place by means such as a screw 37. The movable jaw, with the torsion spring is then positioned within the fixed jaw, and the exposed portion of plug 20 is then brought into position to engage the end portion 34 of the spring within the opening provided for it in the end face of plug 20. Then, with the plug fully inserted in the circular portion of the movable jaw, tension is applied to the spring by revolving the tubular end portion 15 and plug in a clockwise direction with respect to the fixed jaw as seen in FIGURE 5. When the tension is sufficient the plug 20 is secured by means of a screw 38 which is received through a suitable aperture in the fixed jaw and seated in a tapped hole in the plug.

While the jaws 23 and 24 have been shown in the drawings as extending downwardly, for the sake of illustrating details of construction more clearly, in the usual practice it would be preferable to position the jaws in a horizontal position so as to make the attached shopping list more visible to the user, and to permit the customary horizontal nesting of the shopping carts when not in use.

While one form of the invention has been disclosed, it will be apparent to those skilled in the art that various modifications and improvements may be made which would come within the scope of the annexed claims.

I claim:

1. In a shopping cart having a horizontal tubular handle in combination, clamping means for sheet material, said clamping means including a fixed jaw having a horizontally elongated gripping portion and a movable jaw having a horizontally elongated gripping portion, said movable jaw being mounted within the tubular handle for limited rotation about an axis parallel with the axis of the handle, and resilient means for urging the gripping portion of the movable jaw into coacting engagement with the gripping portion of the fixed jaw.

2. The invention as defined in claim 1, wherein said fixed jaw comprises a rectangular strip of sheet material, one end margin forming said gripping portion, the terminal portion of the other end of the strip being formed in longitudinal cross-section to conform with a portion of the transverse cross-section of the handle and being joined in alignment thereto.

3. The invention as defined in claim 2, wherein said tubular handle is circular in cross-section, and the movable jaw comprises an elongated strip of sheet material, one end margin forming said gripping portion, the terminal portion of the other end being formed in longitudinal cross-section in generally circular configuration having a diameter to be loosely received with the terminal portion of the fixed jaw.

4. In a clamping device for sheet material, the combination including a fixed jaw having a first tubular portion at one end, said first tubular portion being longitudinally slotted, a movable jaw having a second tubular portion at one end to be slidably and revolubly received within the first tubular portion, the other end of the movable jaw projecting outwardly through the slotted portion of the first tubular portion, means for retaining the movable jaw in axial alignment with the fixed jaw, and biasing means for urging said jaws into operative engagement.

5. The invention as defined in claim 4, wherein said means for retaining the movable jaw in alignment comprises a pair of plugs positioned at the ends of the first tubular portion.

6. The invention as defined in claim 4, wherein said fixed jaw includes a generally flat portion having an opening therein, and said movable jaw includes an actuator button projecting through said opening.

7. The invention as defined in claim 4, wherein said biassing means comprises coil spring means connected at one end with the movable jaw and secured at the other end with respect to the fixed jaw.

8. The invention as defined in claim 7, wherein a plug is fixed at one end of said first tubular portion, and said other end of the coil spring means secured to said plug.

9. The invention as defined in claim 8, wherein another plug is fixed at the other end of the first tubular portion, both said plugs including cylindrical portions extending axially towards each other within the coil spring means.

References Cited

UNITED STATES PATENTS

| | | | |
|---|---|---|---|
| 2,845,729 | 8/1958 | Baumgart | 40—308 |
| 2,856,660 | 10/1958 | Twohig | 24—253 XR |
| 2,888,761 | 6/1959 | Miller | 40—308 |

EUGENE R. CAPOZIO, *Primary Examiner.*

W. H. GRIEB, *Examiner.*